(12) United States Patent
Singh et al.

(10) Patent No.: US 6,549,135 B2
(45) Date of Patent: Apr. 15, 2003

(54) FOOD-QUALITY AND SHELF-LIFE PREDICTING METHOD AND SYSTEM

(75) Inventors: Abtar Singh, Kennesaw, GA (US); Thomas J. Mathews, Fayette, ME (US); Neal Starling, Canton, GA (US); Paul Wickberg, Marietta, GA (US)

(73) Assignee: Emerson Retail Services Inc., Kennesaw, GA (US)

( * ) Notice: Subject to any disclaimer, the term of this patent is extended or adjusted under 35 U.S.C. 154(b) by 0 days.

(21) Appl. No.: 10/061,958

(22) Filed: Feb. 1, 2002

(65) Prior Publication Data

US 2002/0163436 A1 Nov. 7, 2002

Related U.S. Application Data

(60) Provisional application No. 60/288,551, filed on May 3, 2001.

(51) Int. Cl.[7] .............................................. G08B 19/02
(52) U.S. Cl. ........................ 340/584; 340/585; 340/588
(58) Field of Search .................................. 340/584, 585, 340/588, 5.1, 5.9, 5.91, 5.92; 702/99, 104, 130; 62/3.6, 529

(56) References Cited

U.S. PATENT DOCUMENTS

| | | | |
|---|---|---|---|
| 4,755,957 A | 7/1988 | White et al. | 702/184 |
| 5,045,283 A * | 9/1991 | Patel | 422/56 |
| 5,091,713 A * | 2/1992 | Horne et al. | 340/541 |
| 5,460,006 A * | 10/1995 | Torimitsu | 62/127 |
| 5,487,276 A * | 1/1996 | Namisniak et al. | 62/125 |
| 5,596,507 A | 1/1997 | Jones et al. | 700/276 |
| 5,608,643 A * | 3/1997 | Wichter et al. | 700/244 |
| 5,711,160 A * | 1/1998 | Namisniak et al. | 62/125 |
| 5,798,694 A * | 8/1998 | Reber et al. | 340/540 |
| 6,269,285 B1 * | 7/2001 | Mignault | 700/236 |
| 6,378,315 B1 * | 4/2002 | Gelber et al. | 62/80 |
| 6,411,916 B1 * | 6/2002 | Pellerin | 702/130 |

* cited by examiner

Primary Examiner—Toan Ngoc Pham
(74) Attorney, Agent, or Firm—Harness, Dickey & Pierce, P.L.C.

(57) ABSTRACT

A system is provided for monitoring the food product of a remote food product retailer. The system includes a management center in communication with the remote food product retailer via a communication network. The communication network is accessible via a user interface that may be located at any of the management center, the remote location or some other location. The management center gathers food product temperature information and uses that information to determine whether the shelved food product is within acceptable food safety and quality limits. If the food product exceeds these limits, an alarm is sounded at either the management center and the remote location. The user interface is operable to monitor the status of the food product via a selection of screens and remotely respond to the alarms.

36 Claims, 11 Drawing Sheets

Figure 8

Actions

| Condition | Maintenance Advisory: Non-emergency repair | Maintenance Advisory: Maintenance review remotely and respond as necessary | Store Advisory: Store advised to manually check product temperatures, Maintenance Advisory: Non-emergency repair | Maintenance Alarm: Immediate action required. Store Advisory: advise manually check of product temperatures | Maintenance Advisory: Review remotely and respond as necessary | Store Advisory: Store advised to inspect / correct per procedures; Call maintenance if cannot resolve | Store Alarm: Store must check product temperatures and condition; remove to other refrigerated storage as reqd. | Store Alarm: Store must immediately inspect product in affected fixture; remove product per date code limits | Store Emergency: Store must immediately remove and discard product per date code limits from affected fixture(s) |
|---|---|---|---|---|---|---|---|---|---|
| Prod Temp. Cycling | | | | | X | | | | |
| Pathogen Count Exceeded | | | | | | | | | X |
| Spoiler Count Exceeded | | | | | | | | X | |
| Prod FDA Time-Temp Exceeded | | | | | | | X | | |
| Prod Degree-Min. Exceeded | | | | | | X | | | |
| Prod Time-Temp. Exceed | | | | | | X | | | |
| Disc. Air Degree-Min Exceed | | | | | | | | | |
| Disc. Air Time-Temp. Exceeded | | | | | | | | | |
| Disc. Air Temp. Sensor Failed | | X | | | | | | | |
| Prod. Temp. Sensor Failed | | | X | X | | | | | |
| Disc. Air Temp. Sensor Failed | X | | | X | | | | | |

FOOD-QUALITY AND SHELF-LIFE PREDICTING METHOD AND SYSTEM

This application claims the benefit of U.S. Provisional Application No. 60/288,551, filed May 3, 2001, entitled System For Remote Refrigeration Monitoring And Diagnostics.

FIELD OF THE INVENTION

The present invention relates to food retailers and more particularly to a system for monitoring and evaluating the quality and safety of food inventory and equipment of a food retailer.

BACKGROUND OF THE INVENTION

Produced food travels from processing plants to retailers, where the food product remains on display case shelves for extended periods of time. For improved food quality and safety, food product should not exceed critical temperature limits while being stored in the grocery store display cases. For uncooked food products, the product temperature should not exceed 41° F. Above this critical temperature limit, bacteria grow at a faster rate.

In order to maximize the shelf life and safety of the food product, retailers must carefully monitor the food product stored therein. In general, monitoring of the temperature of the food product enables determination of the bacterial growth rates of the food product. To achieve this, refrigeration systems of retailers typically include temperature sensors within the individual refrigeration units. These temperature sensors feed the temperature information to a refrigeration system controller. Monitoring the food product involves information gathering and analysis. This is a tedious and time-consuming operation that most retailers will neglect. Also, generally speaking, retailers lack the expertise to accurately analyze time and temperature data and relate that data to food product quality and safety.

Therefore, it is desirable in the industry to provide a system for remotely monitoring the food product of a plurality of remote retailers. The system should be able to accurately determine the quality and safety of the food product as a function of the temperature history and length of time stored. Further, the system should provide an alarming routine for signaling when the food product has crossed particular quality and safety limits.

SUMMARY OF THE INVENTION

Accordingly, the present invention provides a system for monitoring food product of a remote location. The system includes a communication network, a management center in communication with the remote location through the communication network and a user interface in communication with the communication network. The management center receives food product temperature information from the remote location for providing the user interface with an alarm when an associated limit has been achieved. In a first embodiment, the associated limit is provided as a food safety limit, whereby the food product includes an associated, variable bacteria count that has achieved a potentially harmful level. In a second embodiment, the associated limit is a food quality limit, whereby the food product includes an associated, variable bacteria count that has achieved an undesirable level.

Further, the present invention provides several methods for determining whether the associated limit has been achieved. Initially, this can be determined by a "time/temperature" method, including the steps of: providing a temperature set point, providing a time set point and determining the limit as a function of the temperature set point and the time set point, whereby the limit is achieved if the food product temperature exceeds the temperature set point for a consecutive time period that is greater than the time set point. Alternatively, a "degree/minute" method including the steps of: determining a set point as a function of a bacterial growth rate of the food product and integrating the food product temperature with respect to time, wherein the limit is achieved if the integration is greater than the set point. Further, a "bacteria count" method is provided, including the steps of: providing a bacteria count set point as a function of bacteria type and determining a bacteria count as a function of the food product temperature and time, wherein the limit is achieved if the bacteria count achieves the bacteria count set point.

BRIEF DESCRIPTION OF THE DRAWINGS

The present invention will become more fully understood from the detailed description and the accompanying drawings, wherein:

FIG. 8 is a graph of alarming conditions and actions in response to each condition;

DETAILED DESCRIPTION OF THE PREFERRED EMBODIMENTS

The following description of the preferred embodiments is merely exemplary in nature and is in no way intended to limit the invention, its application, or uses.

Figure 1A:
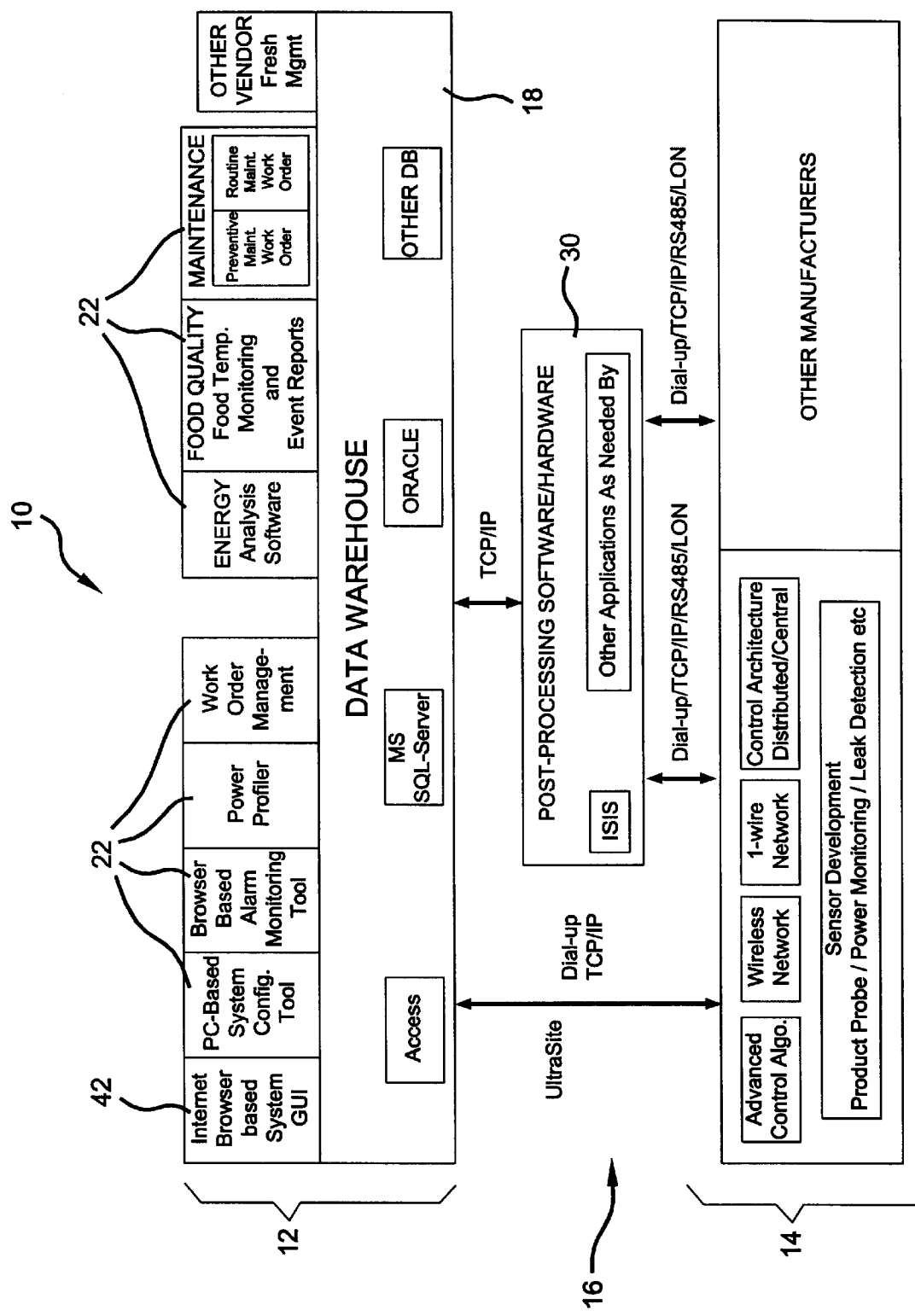
FIG. 1A is a schematic overview of a system for remotely monitoring and evaluating a remote location, in accordance with the principles of the present invention.

With reference to FIG. 1A, the present invention provides a system 10 for remote monitoring, diagnosis and prognosis of food inventory and equipment of a food retailer. The system includes a management center 12 in communication with a remote location 14, such as a food retail outlet having food inventory and equipment such as a refrigeration system, HVAC system, lighting and the like, therein and generally represented at 16. A communication network 18 is provided for operably interconnecting the management center 12 and the remote location 14 to enable information transfer therebetween. The communication network preferably includes a dial-up network, TCP/IP, Internet or the like. It will be appreciated by those skilled in the art, that the management center 12 may be in communication with a plurality of remote locations 14 through the communication network 18. In this manner, the management center 12 is able to monitor and analyze operation of multiple remote locations 14.

The management center 12 gathers operational data from the remote location 14 to analyze the performance of several aspects of the location through post-processing routines. Initially, the management center 12 may process temperature information for generally monitoring food quality and safety using one of the various methods described hereinbelow. Food quality and safety monitoring enables the management center 12 to alert a remote location 14 of food safety and quality performance. In this manner, the remote location is able to adjust the operation of its systems 16 to improve performance.

Also, the management center 12 may gather and process energy consumption information for its energy using equipment including various components of the refrigeration system 16 and the refrigeration system 16 as a whole. An analysis of the energy consumption of the energy using equipment enables the management center 12 to evaluate the overall efficiency thereof and identify any problem areas therewith. Finally, the management center 12 may gather information specific to each component of the refrigeration system 16 for evaluating the maintenance measures each component may require. Both routine and preventative maintenance may be monitored and evaluated, thereby enabling the management center 12 to alert the remote location 14 of potential equipment malfunctions. In this manner, overall efficiency of the refrigeration system 16 may be enhanced.

Additionally, the management center 12 provides a data warehouse 22 for storing historical operational data for the remote location. The data warehouse 22 is preferably accessible through the communication network 18 utilizing commercially available database software such as Microsoft Access™, Microsoft SQL-Server™, ORACLE™, or any other database software.

The communication network 18 is remotely accessible by a third-party computer system 24. In an exemplary embodiment, a remote user may log into the system through the Internet to view operational data for the refrigeration system 16. The third-party computer system 24 may include any web-enabled graphical user interface (GUI) 24 known in the art, including but not limited to a computer, a cellular phone, a hand-held portable computer (e.g., Palm Pilot™) or the like.

The GUI 24 provides access to view the system 10 and enables the user to see the data at the remote location 14, preferably via a standard web browser. The GUI 24, using only a standard web browser and an Internet connection, also provides access to software modules 32 that will run on a server. Maintenance managers may use the GUI 24 to receive alarms for a specific remote location 14, acknowledge alarms, manually dispatch work orders based on the alarms, make changes to setpoints, ensure that the remote location 14 is performing as required (by monitoring case temperatures, rack pressures, etc.), and check the remote location 14 after the receipt of an alarm. The GUI 24 may also be used as an on-site store display of a floor plan with operating conditions for equipment in the remote location 14.

More specifically, the system 10 will make use of existing network infrastructure to add value to users who use the system 10 for collecting, aggregating and analyzing data. This value includes speeding up (and automating) the data collection process and enabling automated aggregation of data. The information that is retrieved from a remote location 14 resides on database servers. Further, the system 10 provides the ability to add software modules to the server (that can be accessed with a standard web browser) that will extract particular data from the retrieved information. Examples include analyzing trend information of component status over a period of time and extracting performance degradation characteristics of the components.

Figure 1B:
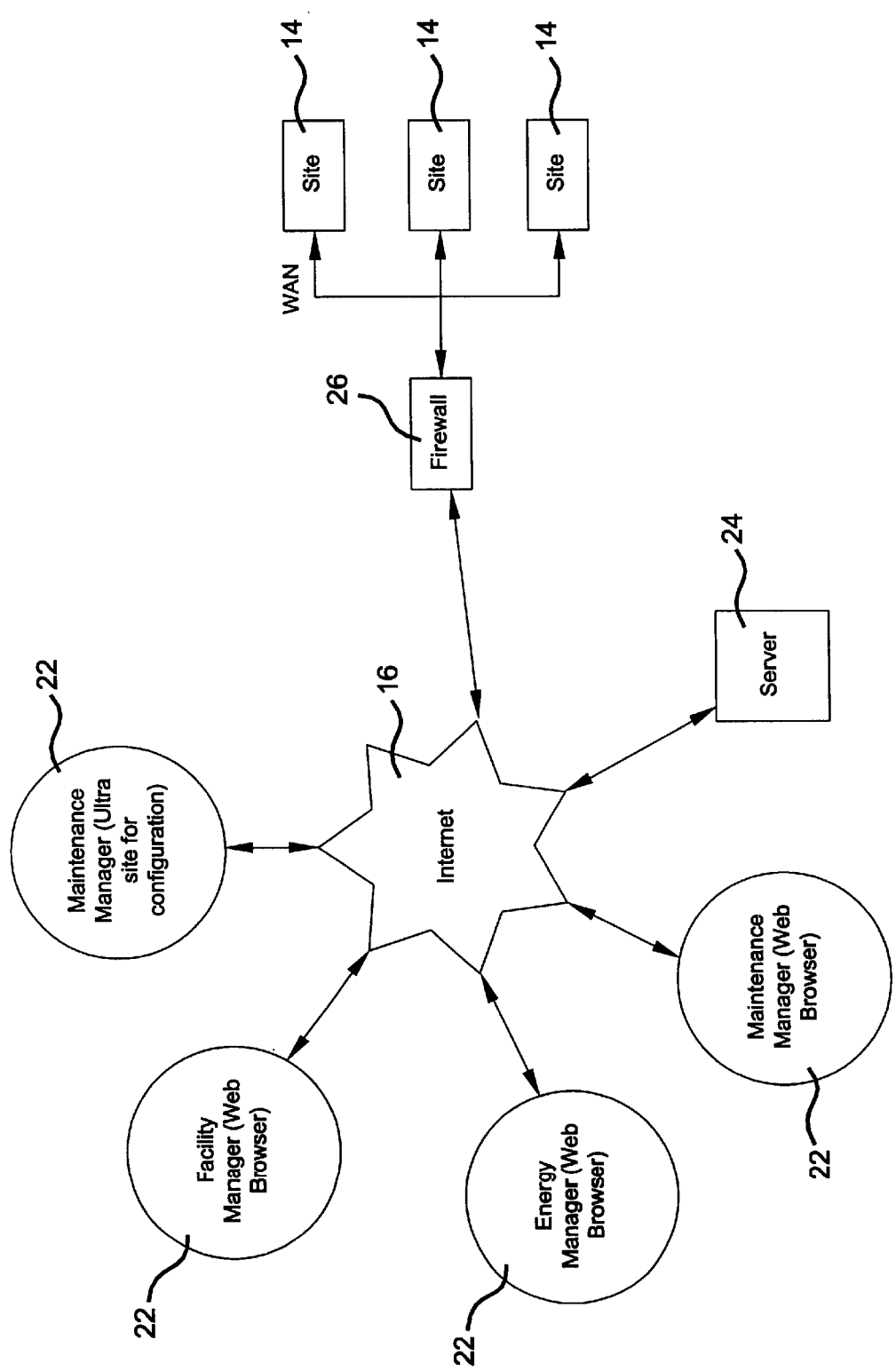
FIG. 1B is a more general schematic view of the system of FIG. 1A.

FIG. 1B shows a diagram of the communications architecture. Note that multiple remote locations 14 exist behind a management center firewall 28 and that data behind the firewall 28 must be pushed to a server 30 that exists outside the firewall 28. Users are able to access the information (both information on the server 30 and information at the remote location 14) via an Internet connection in the standard browser. In general, a user is given the impression that he is always going through the server 30 to retrieve information from the remote location 14. It is possible for a user (with a web browser) to view both real-time data generated at the remote location 14 and aggregated data in a single view. Using this architecture, software modules 32 can be easily added to perform functions on the data.

Web-based navigation is accomplished by the GUI 24, which is interfaced with each software module 32. An alarm monitoring, software module 32 is described below, and is accessible via the GUI 24. Although the present discussion is limited to detailing the alarm monitoring softward module 32, it will be appreciated that other software modules 32, such as energy analysis, food quality, and maintenance, are available for use by the user.

The GUI 24 may further include standard screens for viewing typical site data. For example, a store summary screen is available for users who choose not to have a custom floor plan screen. The summary screen lists the status of the refrigeration of the remote location control systems. A product temperature summary screen displays product temperatures throughout the remote location 14 when product temperature probes are implemented. An alarm screen enables the user to see the status of all alarms, providing information about particular alarms and enabling acknowledgment and resetting of the alarm. Also provided is basic alarm viewing/notification capability including the capability to view an alarm, acknowledge an alarm, and receive notification of the alarm. Notification may be one of either via GUI/browser, e-mail, facsimile, page, or text message (SMS/e-mail) to a cellular telephone. Each alarm type includes the capability of selecting whether notification is required, the notification method, and to whom notification is provided.

The GUI 24 includes the capability of displaying historical (i.e., logged) data in a graphical format. In general, the graph is accessible from the standard screens described in further detail hereinbelow, with a single click. Data is overlayed from different areas (for example, case temperature with saturated suction temperature) on a single graph. Some historical data may be stored on a server. In general, the display of this data is seamless and the user is unaware of the source of the data.

The GUI 24 further provides the capability to display aggregated enterprise data, which are displayed as aggregated values and include the capability to display power and alarm values. These views may be selected based on user requirements. For example, the GUI 24 may provide the capability to display aggregated enterprise power data for an energy manager and aggregated alarm data for a maintenance manager. The GUI 24 provides a summary-type enterprise screen with power and alarms for the enterprise as a default.

The GUI 24 further provides the capability to change frequently used setpoints directly on the appropriate standard screen. Access to other setpoints will be via a screen that can be easily navigated to with one click from the status screen. In general, applications on controllers have many setpoints, most of which are not used after the initial setup. Setpoint changes generally occur whenever a store reconfigures the merchandise within its refrigeration cases.

Returning to FIG. 1A, the remote location 14 includes a central processing system 40 in communication with the components of the refrigeration system 16 through a controller (not shown). The central processing system 40 is preferably in communication with the controller through a dial-up, TCP/IP, or local area network (LAN) connection. The central processing system provides intermediate processing of gathered data, which is analyzed to provide lower-level, local warnings. These lower-level, local warnings are in contrast to more detailed, higher-level warnings provided by the post-processing routines of the management center 12. The central processing system 40 is preferably accessible by a "In Store Information Server", or ISIS, generally provided as a web gateway. The ISIS platform of the preferred embodiment is a JACE-brand controller/web server commercially available from Tridium of Richmond, Va.

Figure 2:
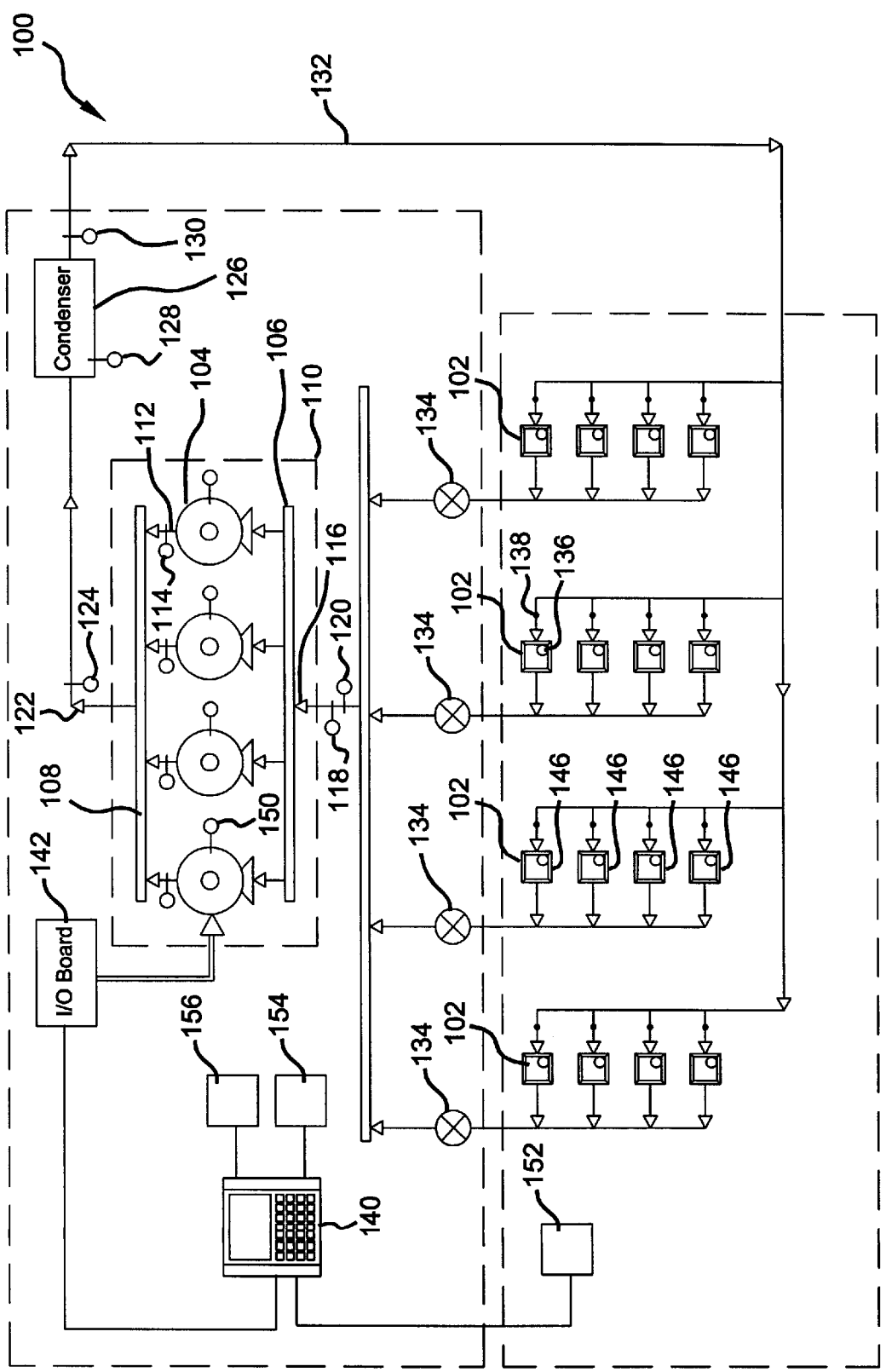
FIG. 2 is a schematic view of an exemplary refrigeration system according to the principles of the present invention.
Figure 3:
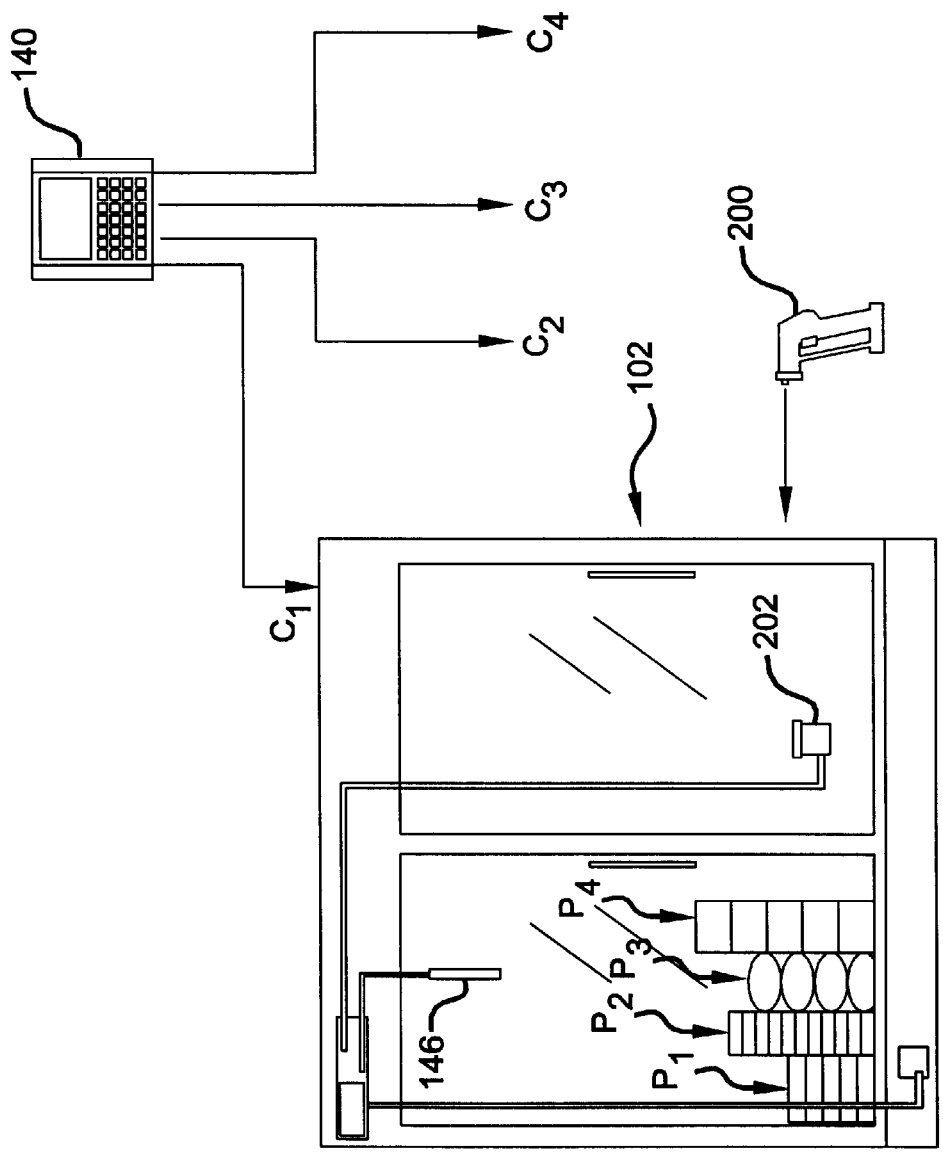
FIG. 3 is a frontal view of a refrigeration case of the refrigeration system of FIG. 2.

With reference to FIGS. 2 and 3, the refrigeration system 16 of the remote location 14 preferably includes a plurality of refrigerated food storage cases 100. In an exemplary embodiment, the refrigeration system 16 includes a plurality of compressors 102 piped together with a common suction manifold 104 and a discharge header 106 all positioned within a compressor rack 108. A discharge output 110 of each compressor 102 includes a respective temperature sensor 104. An input 112 to the suction manifold 104 includes both a pressure sensor 114 and a temperature sensor 116. Further, a discharge outlet 118 of the discharge header 106 includes an associated pressure sensor 120. The various sensors are implemented for evaluating maintenance requirements, and monitoring performance of the refrigeration system 16.

The compressor rack 108 compresses refrigerant vapor (not shown) that is delivered to a condenser 122 where the refrigerant vapor is liquefied at high pressure. The condenser 122 includes an associated ambient temperature sensor 124 and an outlet pressure sensor 126. This high-pressure liquid refrigerant is delivered to the plurality of refrigeration cases 100 by way of piping 128. Each refrigeration case 100 is arranged in separate circuits consisting of a plurality of refrigeration cases 100 that operate within a certain temperature range. FIG. 2 illustrates four (4) circuits labeled circuit A, circuit B, circuit C and circuit D. Each circuit is shown consisting of four (4) refrigeration cases 100. However, those skilled in the art will recognize that any number of circuits, as well as any number of refrigeration cases 100 may be employed within a circuit. As indicated, each circuit will generally operate within a certain temperature range. For example, circuit A may be for frozen food, circuit B may be for dairy, circuit C may be for meat, etc.

Because the temperature requirement is different for each circuit, each circuit includes a pressure regulator 130 that acts to control the evaporator pressure and, hence, the temperature of the refrigerated space in the refrigeration cases 100. The pressure regulators 130 can be electronically or mechanically controlled. Each refrigeration case 100 also includes its own evaporator 132 and its own expansion valve 134 that may be either a mechanical or an electronic valve for controlling the superheat of the refrigerant. In this regard, refrigerant is delivered by the piping 128 to the evaporator 132 in each refrigeration case 100. The refrigerant passes through the expansion valve 134 where a pressure drop causes the high-pressure liquid refrigerant to achieve a lower pressure combination of liquid and vapor. As hot air from the refrigeration case 100 moves across the evaporator 132, the low-pressure liquid turns into gas. This low-pressure gas is delivered to the pressure regulator 130 associated with the particular circuit. At the pressure regulator 130, the pressure is dropped as the gas returns to the compressor rack 108. At the compressor rack 108, the low-pressure gas is again compressed to a high pressure gas, which is delivered to the condenser 122, which creates a high pressure liquid to supply to the expansion valve 134 and start the refrigeration cycle again.

A main refrigeration controller 136 is used and configured or programmed to control the operation of the refrigeration system 16. The refrigeration controller 136 is preferably an Einstein Area Controller offered by CPC, Inc. of Atlanta, Ga., or any other type of programmable controller that may be programmed, as discussed herein. The refrigeration controller 136 controls the bank of compressors 102 in the compressor rack 108, via an input/output module 138. The input/output module 138 has relay switches to turn the compressors 102 on and off to provide the desired suction pressure. A separate case controller 140, such as a CC-100 case controller, also offered by CPC, Inc. of Atlanta, Ga. may be used to control the superheat of the refrigerant to each refrigeration case 100, via an electronic expansion valve 134 in each refrigeration case 100 by way of a communication network or bus. Alternatively, a mechanical expansion valve may be used in place of the separate case controller 140. Should separate case controllers 140 be utilized, the main refrigeration controller 136 may be used to configure each separate case controller 140, also via the communication bus. The communication bus may either be a RS-485 communication bus or a LonWorks Echelon bus that enables the main refrigeration controller and the separate case controllers to receive information from each case.

Each refrigeration case 100 may have a temperature sensor 146 associated therewith, as shown for circuit B. The temperature sensor 146 can be electronically or wirelessly connected to the controller 136 or the expansion valve 134 for the refrigeration case 100. Each refrigeration case 100 in the circuit B may have a separate temperature sensor 146 to take average/min/max temperatures or a single temperature sensor 146 in one refrigeration case within circuit B may be used to control each case 100 in circuit B because all of the refrigeration cases 100 in a given circuit operate at substantially the same temperature range. These temperature inputs are preferably provided to the analog input module 138, which returns the information to the main refrigeration controller 136 via the communication bus.

Additionally, further sensors are provided and correspond with each component of the refrigeration system 16 and are in communication with the refrigeration controller 136. Energy sensors 150 are associated with the compressors 102 and condenser 122 of the refrigeration system 16. The energy sensors 150 monitor energy consumption of their respective components and relay that information to the controller 136.

It will be appreciated that the hereindescribed refrigeration system 16 is merely exemplary in nature. The refrigeration system 16 of the remote location 14 may vary as particular design requirements of the remote location 14 dictate.

Circuits and refrigeration cases 100 are provided with a display screen 151 graphically illustrating the type and status of the particular refrigeration case 100. Temperatures are displayed via graphical means (thermometer) with an indication of setpoint and alarm values. The screens 151 support the display of case temperatures (return, discharge, defrost termination, coil in, coil out, and product temperatures) and the status of any digital inputs (cleaning, termination, etc.). The screens 151 also display a defrost schedule and the type of termination (time, digital, temperature) for the last defrost. In general, all information related to a refrigeration case 100 or circuit will be displayed on the screen or is accessed with one click on the screen.

The display screen 151 also graphically displays the status of each configured suction group. Suction and discharge pressure is graphically displayed as gauges intended to be similar to a type of gauge set that refrigeration mechanics use. Corresponding saturated suction temperature is displayed as well. In general, suction groups should be displayed graphically with icons that represent each compressor 102. The status of the compressors 102 is shown graphically. The status of any configured unloaders will be displayed graphically as well. In general, all status information for a suction group is displayed on the screen.

The display screen 151 will also be provided to graphically display the status of the condenser 122. In general, the condenser 122 is displayed graphically with icons that represent each fan, and the status of the each fan is shown graphically. In general, all status information for a condenser 122 is displayed on the screen.

A screen can also be provided for roof top units (not shown). The status of the roof top unit will be shown with animated graphics (fan, airflow, cooling, heating, as animated pieces). The screen will also show the space temperature, supply temperature, etc. The set point and alarm values are shown for the space temperature. Humidity and humidity control may also be shown if so configured.

Remote locations 14 having refrigeration systems 16 typically include food-product retailers and the like. The food-product retailers are concerned with both the safety and the aesthetic quality of the food products they sell. Generally, bacteria that pose a threat to human health are referred to as "pathogen" bacteria and grow quickly when the temperature of their host product rises above a certain threshold temperature. For example, 41° F. is recognized industry-wide as the temperature below which most pathogens grow slowly and below which perishable food products should be stored. Bacteria that diminish the quality (color, smell, etc.) of a food product are referred to as "spoiler" bacteria and have growth rates that vary from product to product. Spoiler bacteria generally grow more quickly than pathogen bacteria. Thus, a food product's quality may appear to be of poor color or smell but still safe for human consumption. Bacteria populations and disease risk are a function of both the frequency and severity of over-temperature product conditions. Biological growth rates increase non-linearly, as a product warms past 41° F. For example, a product at 51° F. is more likely to host large colonies of toxic bacteria than a product at 44° F. However, there may be as much risk from having the product in a case at 44° F. for a longer period of time than in a single case at 51° F. for a shorter period of time.

The temperature of a host food product, as mentioned above, significantly influences the rate at which bacteria, whether spoiler or pathogen, grows. Generally, conventional refrigeration systems 16 function using a cyclical temperature strategy. According to the cyclical temperature strategy, low and high temperature set points are predetermined. The refrigeration system 16 operates to cool the products until the low temperature set point is achieved. Once achieving the low-temperature set point, the refrigeration system ceases cooling the food product and the temperature of is allowed to rise until meeting the high-temperature set point. Once the high-temperature set point is achieved, cooling resumes until again meeting the low-temperature set point.

Figure 4:
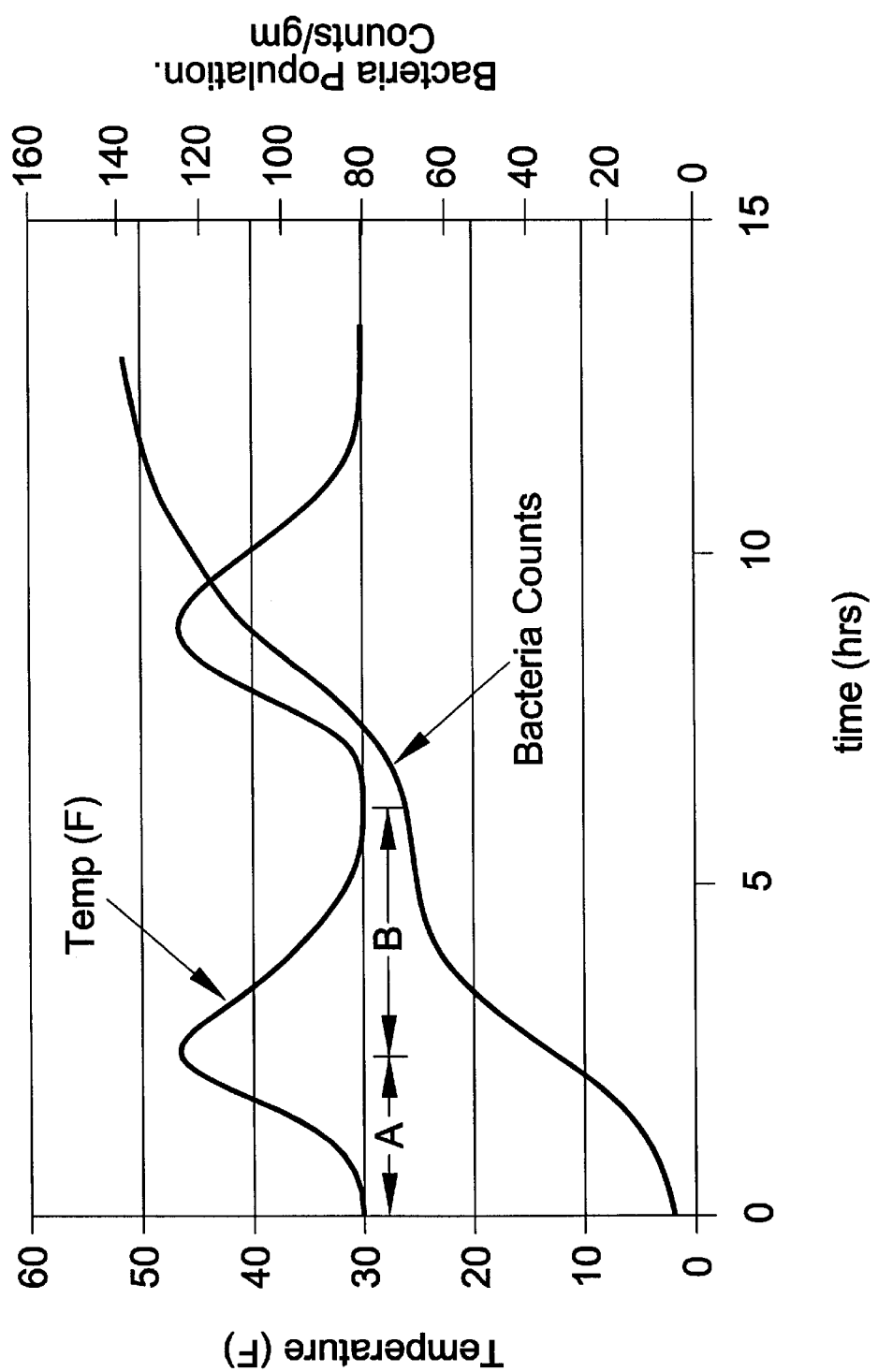
FIG. 4 is a graph displaying cyclical temperature effects on bacteria growth within the refrigeration system.

With particular reference to FIG. 4, cyclical temperature control and its effects on bacterial growth will be discussed in detail. An increase in temperature increases the rate at which bacteria grows. Time period A of the chart of FIG. 4 shows an exemplary increase in temperature from approximately 30° F. to approximately 50° F. An increase in bacteria count is associated with the rise in temperature. The bacteria count of time period A rises from approximately 10,000 counts/gm to 40,000 counts/gm. Time period B shows an exemplary decrease in temperature from the 50° F. achieved at the end of time period A, to approximately 30° F. A decrease in the rate at which the bacteria grows is associated with the decrease in temperature. It is important to note, however, that the bacteria count still increases and only slows significantly when the temperature cools to 30° F. The exemplary increase in bacteria count rises from approximately 40,000 counts/gm to 70,000 counts/gm. The first half of time period B reflects a significant rate of growth of bacteria while a decrease in the rate is not achieved until the latter half of time period B. Thus, re-chilling or re-freezing of food products does not kill or reduce the bacteria-count, but simply reduces the growth rate of the bacteria.

The system of the present invention implements a variety of monitoring and alarming routines provided in the form of software. Components of these routines include product temperature monitoring and alarming. To achieve this, the routines include a time/temperature alarming routine, a degree/minutes alarming routine and a bacteria-count alarming routine. While each of these routines is described in detail hereinbelow, it should be noted that in terms of food safety and quality they are listed in order of increasing effectiveness. In other words, the time/temperature alarming routine provides a good means of monitoring product temperature while the bacteria-count alarming routine provides the most effective means.

Figure 5:
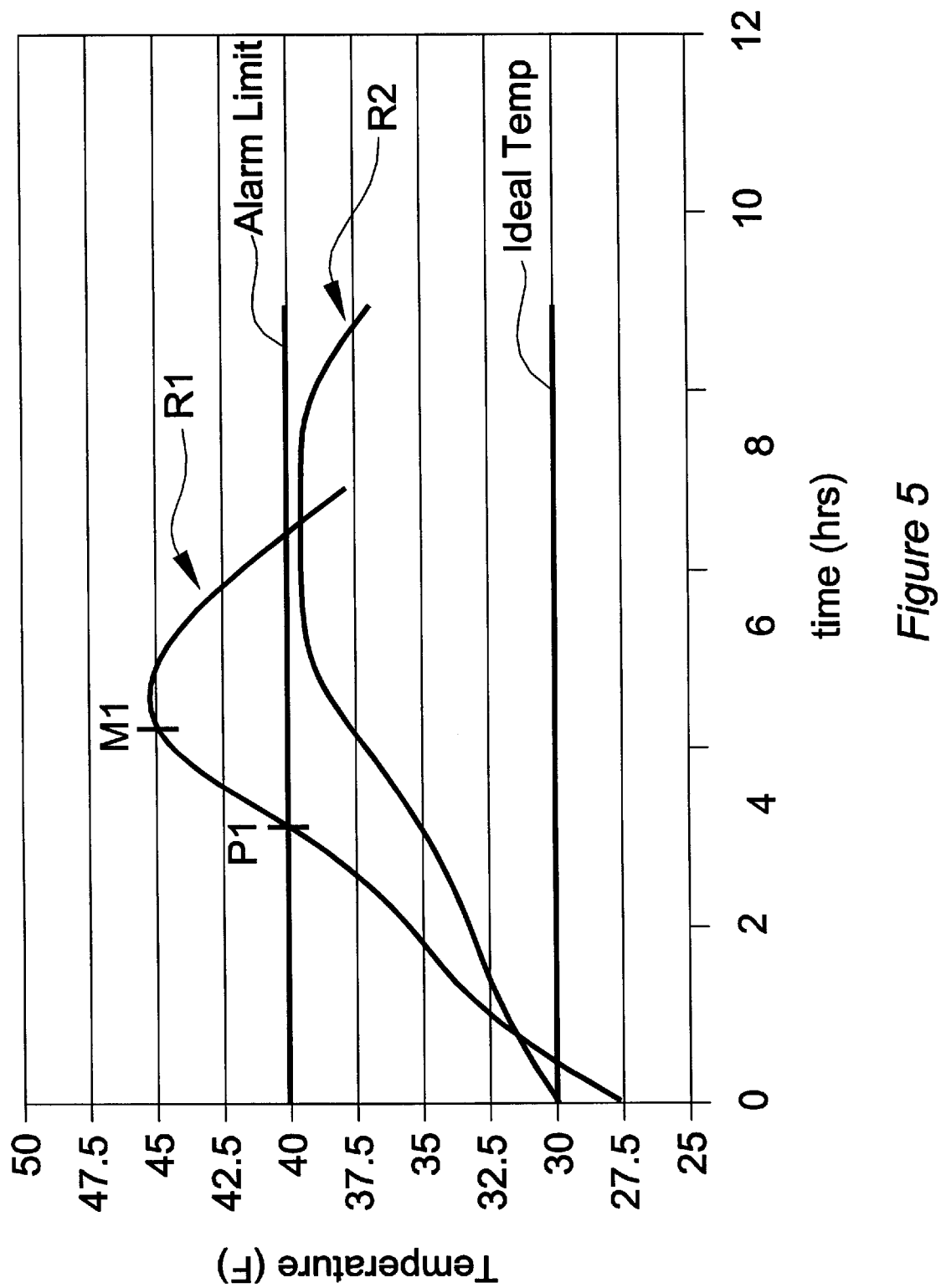
FIG. 5 is a graphical representation of a time-temperature method for monitoring bacteria growth within the refrigeration system.

With reference to FIG. 5, the time/temperature alarming routine will be described in detail. Initially, both time and temperature set points are provided. In the exemplary embodiment of FIG. 5, the time set point is sixty minutes (60) and the temperature set point is 40° F. The time and temperature set points are combined to provide an alarming point. In the exemplary case, the alarming point would be the point at which the product has been at a temperature greater than 40° F. for longer than sixty minutes (60). With reference to alarm scenario R1 of FIG. 5, the product temperature passes 40° F. at point P1. Thus, the sixty minute (60) clock begins running at point P1. If the product temperature has not fallen back below 40° F. within the sixty minute (60) timeframe then an alarm is signaled. Point M1 represents the point at which sixty minutes (60) have passed and the temperature has remained over 40° F. Therefore, in accordance with the time/temperature routine, an alarm would be signaled at point M1.

Although the above-described time/temperature routine is a good method of monitoring product temperature, it retains specific disadvantages. One disadvantage is that bacteria count is not considered. This is best illustrated with reference to alarm scenario R2. As can be seen, the product temperature of alarm scenario R2 increases, approaching the 40° F. temperature set point without ever crossing it. As discussed above, with respect to FIG. 4, increases in temperature, even though below the 40° F. temperature set point, results in increased rate of bacteria growth. Thus, although the time/temperature routine would not signal an alarm in alarm scenario R2, bacteria growth would continue, approaching undesired levels of bacteria count over time.

Figure 6:
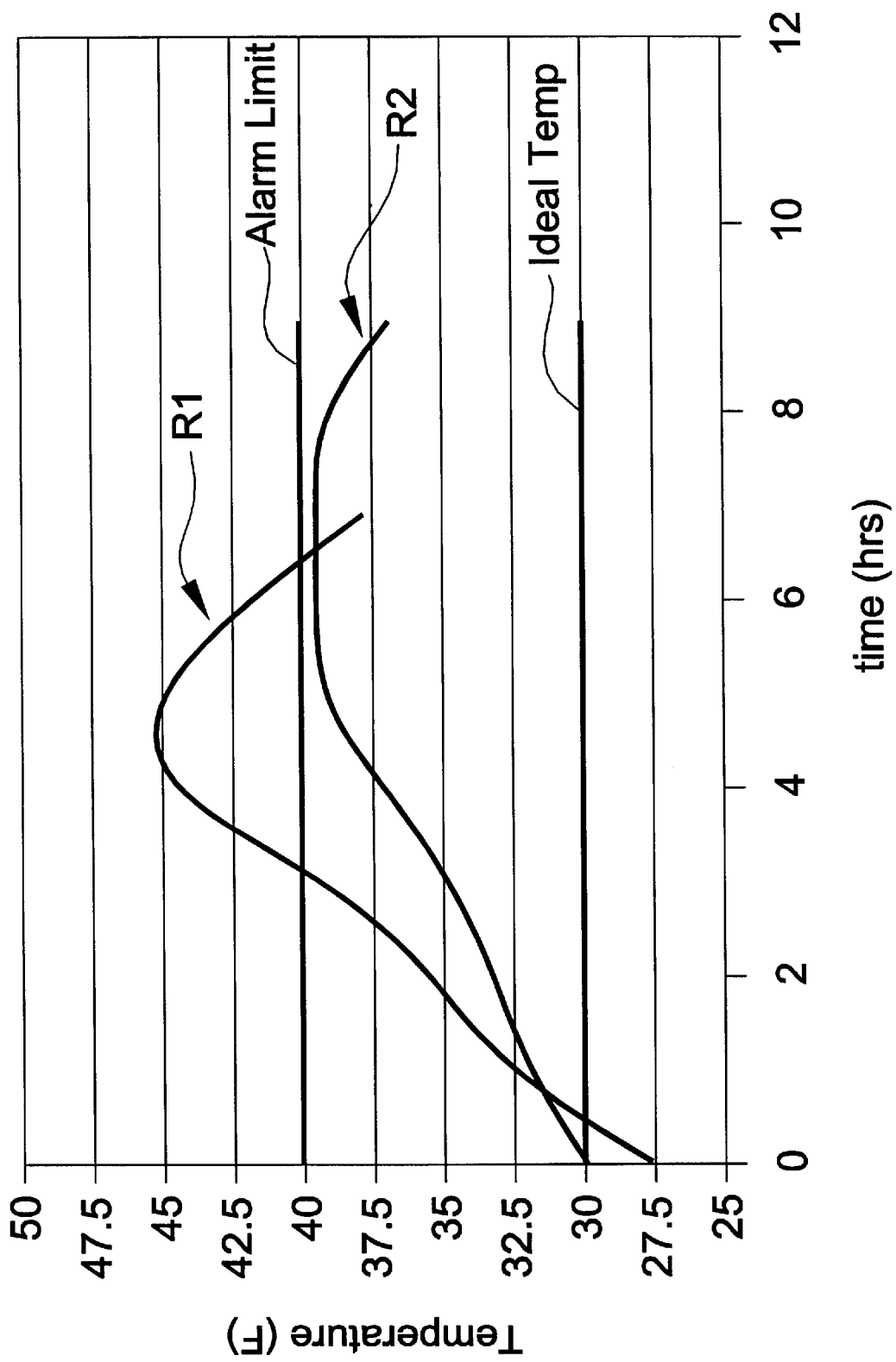
FIG. 6 is a graphical representation of a degree-minute method for monitoring bacteria growth within the refrigeration system.

With reference to FIG. 6, the degree/minutes alarming routine will be described in detail. Initially, a degree/minutes set point is determined. In the exemplary case, the degree/minutes set point is 800. This value is provided as an average value determined from historical data and scientific testing and analysis of bacteria growth. In this manner, bacteria growth is considered when determining whether an alarm is signaled. With reference to alarm scenarios R1 and R2 of FIG. 6, the degree/minute alarming routine integrates the ideal product temperature curve (i.e., area above "ideal temp" line) with respect to time. If the integration results in a value of 800 or greater, an alarm is signaled. In the exemplary case both alarm scenarios R1, R2 would result in an alarm. Alarm scenario R1 would most likely signal an alarm prior to alarm scenario R2. This is because the bacteria growth rate would be significantly higher for alarm scenario R1. An alarm would be signaled in alarm scenario R2 because, although the product temperature of alarm scenario R2 never rises above an accepted temperature (i.e., 40° F.), the borderline temperature of alarm scenario R2 results in a high enough bacteria growth rate that undesired bacteria levels would be achieved in time.

Figure 7:
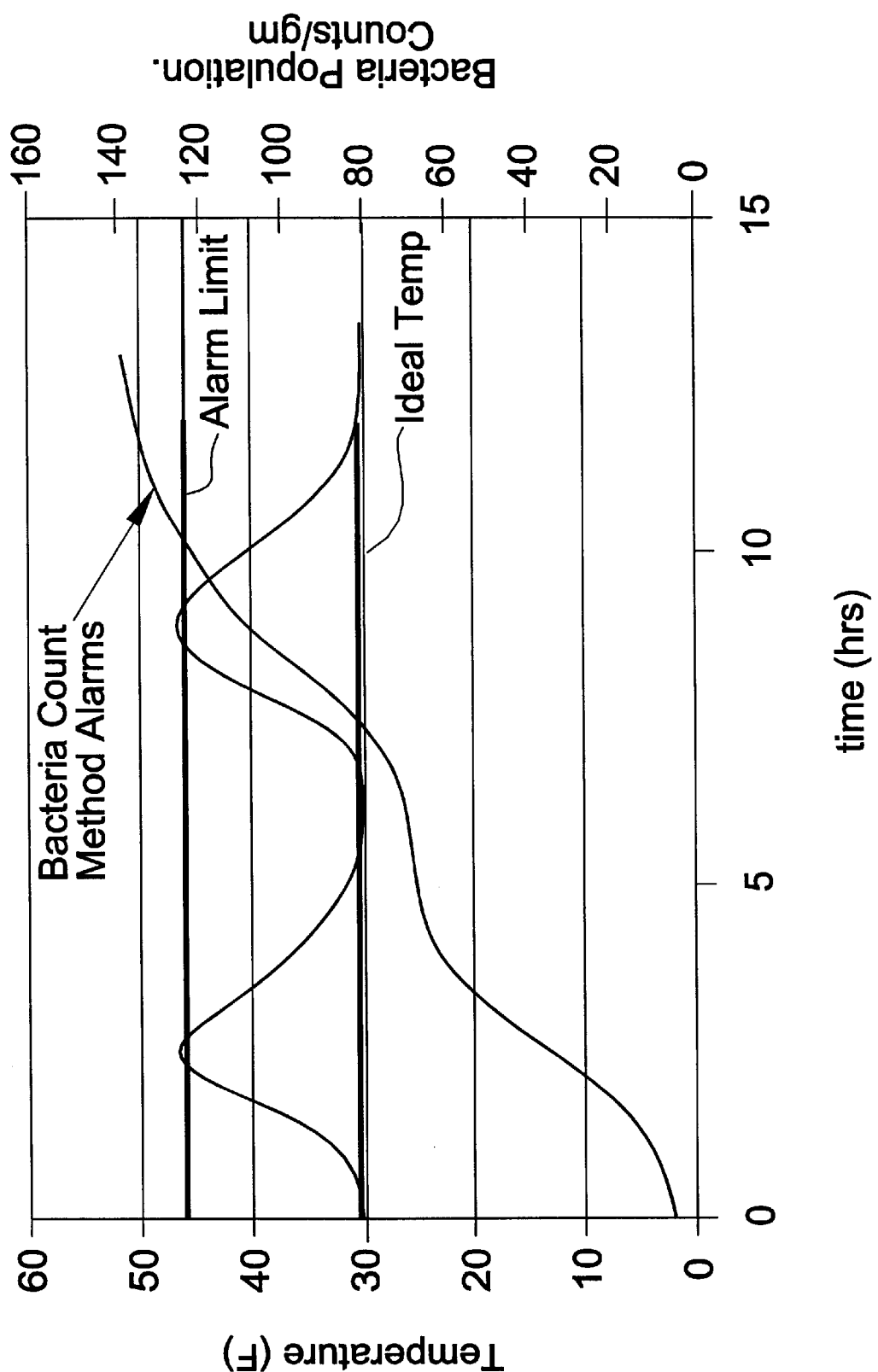
FIG. 7 is a graphical representation of a bacteria count method for monitoring bacteria growth within the refrigeration system.

With reference to FIG. 7, the bacteria-count alarming routine will be described in detail. Initially, an alarm set point is determined according to the maximum acceptable bacteria count for the product. In the exemplary case, the alarm set point is approximately 120,000 counts/gram. FIG. 7, similarly to FIG. 4, shows a cyclical-temperature curve and a bacteria-count curve. The bacteria-count routine periodically calculates the bacteria count for a given temperature at a given time, thereby producing the bacteria-count curve. Given the cyclical temperature of the exemplary case of FIG. 7, neither of the aforementioned alarming routines would signal an alarm. However, using the bacteria-count routine, once the bacteria count is greater than the 120,000 counts/gram alarm set point, an alarm is signaled. As noted previously, the bacteria count alarming routine is the most effective of those described herein. The effectiveness of the bacteria count alarming routine is a result of the direct relation to an actual bacteria count of the product.

Bacteria count is calculated for each type of bacteria (i.e. pathogen, spoiler), and is a function of a base bacteria count, time, product type, and temperature. Initially, base bacteria counts ($N_o$) are provided for each type of bacteria. As provided by the present invention, an exemplary base bacteria count for pathogen bacteria is 100 counts/gram and for spoiler bacteria is 10,000 counts/gram. These values have been determined through experiment and analysis of the bacteria types. Both the product type and temperature determines the rate at which a particular type of bacteria will grow. The present invention further provides initial temperatures for both pathogen and spoiler bacteria, at which, their respective growth is effectively stopped. In an exemplary embodiment, the initial temperature for pathogens is 29° F. and for spoilers is 18.5° F. Similarly to the initial bacteria count values, these values have been determined through experiment and analysis of the bacteria types. In general, experimental bacteria counts for both pathogens and spoilers were plotted with respect to temperature. A line was interpolated for each and extrapolated to find their respective y-intercepts, or in other words, temperature values for zero growth.

Figure 9:
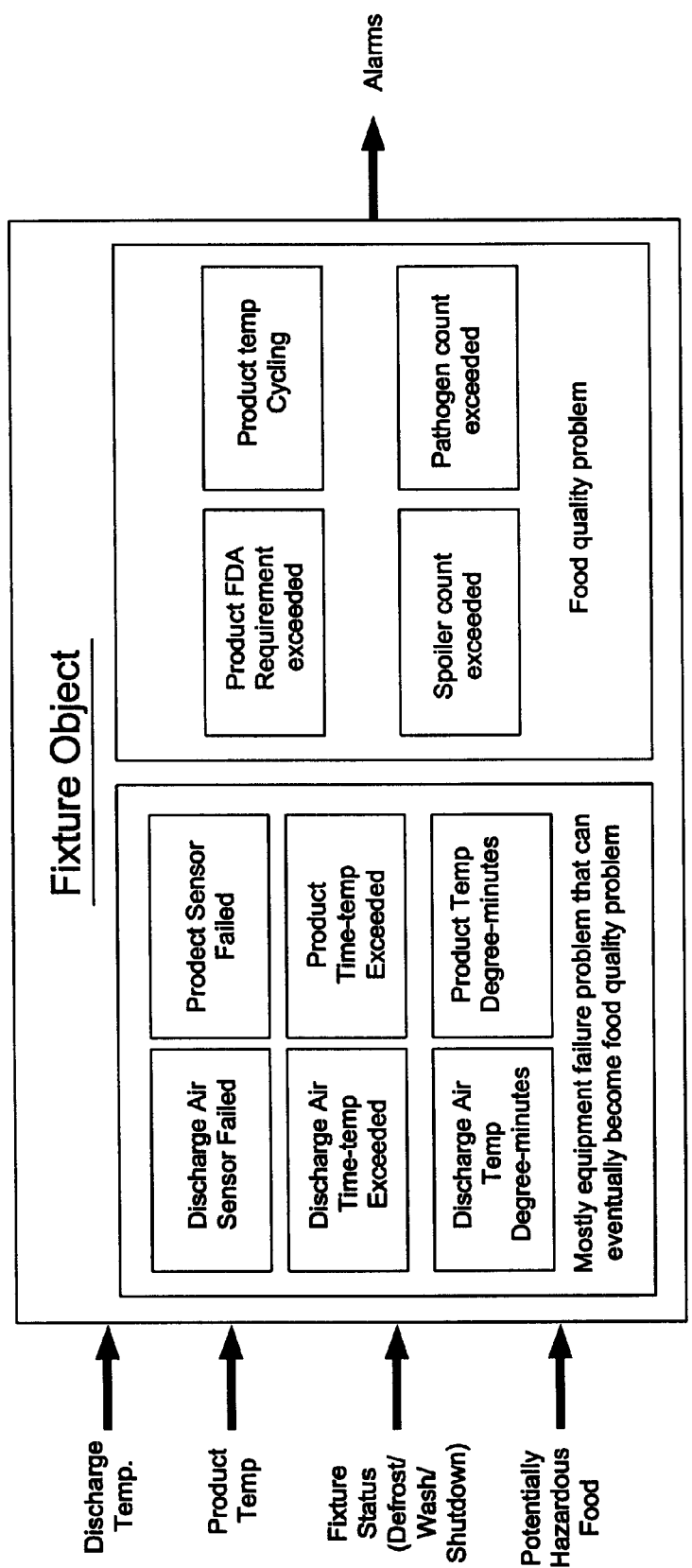
FIG. 9 is a schematic view of the alarming conditions implemented by the system of the present invention.

The system of the present invention further provides an alarming system for alerting the management center 12 or intermediate processing center 40 of particular situations. The graph provided in FIG. 8 outlines ten main alarming conditions and the corresponding operator action. These alarming conditions include: discharge air temperature sensor failure, product temperature sensor failure, discharge air temperature exceeded, discharge air degree-minute exceeded, product time-temperature exceeded, product degree-minute exceeded, product FDA time-temperature exceeded, spoiler count exceeded, pathogen count exceeded and product temperature cycling. As shown schematically in FIG. 9, the first six alarming conditions relate to equipment failure that would potentially lead to food quality and safety problems. The last four alarming conditions relate directly to food quality and safety.

More particularly, the equipment alarming conditions relating to discharge are sensor failure, food product sensor failure, discharge air-temp exceeded, product time-temp exceeded, discharge air temp degree-minutes met and product temp degree-minutes met. Each of these situations can potentially lead to a food quality problem. The food quality and safety alarming conditions relate to product FDA requirements exceeded, product temp cycling, spoiler count exceeded and pathogen count exceeded. Each of these situations relates to a food quality and safety problem.

Figure 10:
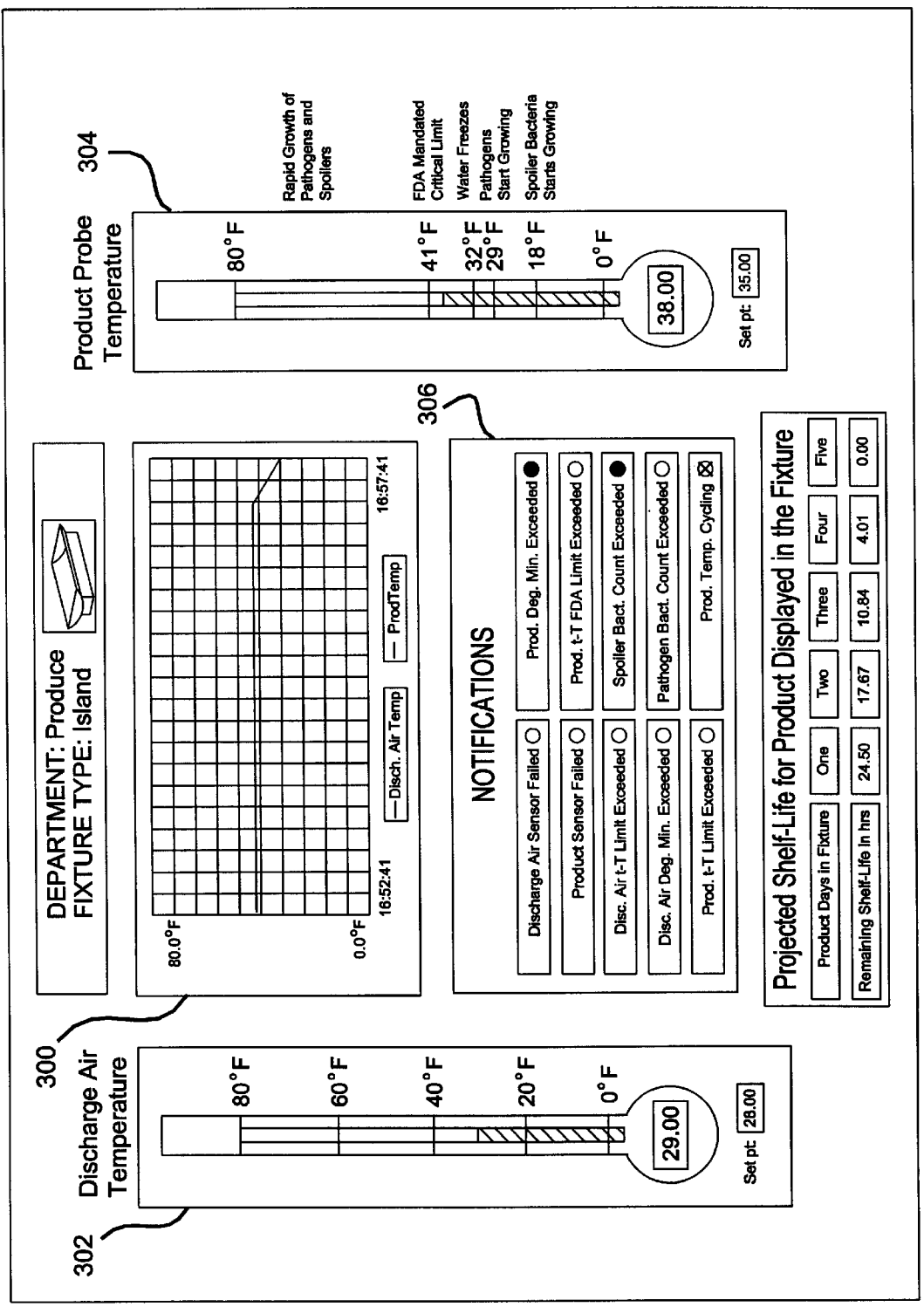
FIG. 10 is a screen-shot of a user interface of the system for monitoring a particular food storage case of a particular location.

As described in detail above, the system provides a web-based operator interface for monitoring the conditions of a particular location. With reference to FIG. 10, a screenshot is provided detailing an exemplary user interface 200 for monitoring the status of a particular fixture within a particular location. The centrally disposed graph 202 provides real-time output of both the discharge air temperature and the product temperature. Further provided are discharge air temperature and product probe temperature thermometers 204,206 for representing current temperature conditions. The product probe temperature is recorded by a product probe 152, disposed within the particular case (see FIG. 3). Disposed immediately below the real-time graph 202 is a notification board 208 displaying each of the ten alarming conditions described above. Immediately below the notification board 208 is a shelf-life estimation board 210 that shows the number of shelf-life hours remaining per the number of days a particular product has been stored within the case. The shelf life estimation method is case based. A new counter is started for each day and has a maximum length of five days. Generally, food product turnover is less than five days; however, the maximum length of days may vary. For each day, bacteria count is determined, as described above, using the particular temperatures experienced by the case for that day. In this manner, the growth of bacteria for the given case can be monitored and evaluated to determine how much longer products put into the case on a particular day may safely remain in the case. For example, the shelf life of a product that has been put into a case one day ago is a function of the temperatures experienced over the first day. At the same time, however, the shelf life of a product that has been in the case for three days will be determined as a function of the temperatures experienced over those three days.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for indicating to a food product retailer a characteristic of food product stored within a retailer, comprising the steps of:
   setting a first indication limit;
   providing an initial count for a first bacteria type;
   monitoring a temperature of the food product;
   periodically calculating a bacteria count for said first bacteria type as a function of said initial count for said first bacteria type and said temperature; and
   providing an indication when said bacteria count of said first bacteria type achieves said first indication limit.

2. The method of claim 1, further comprising the steps of:
   setting a second indication limit;
   providing an initial count for a second bacteria type;
   periodically calculating a bacteria count for said second bacteria type as a function of said initial count for said second bacteria type and said temperature; and
   providing an indication when said bacteria count of said second bacteria type achieves said second indication limit.

3. The method of claim 2, wherein said first bacteria type is one of pathogen bacteria and spoiler bacteria and wherein said second bacteria type is the other of said pathogen bacteria and spoiler bacteria.

4. The method of claim 2, wherein periodically calculating a bacteria count of either of said first and second bacteria types is further a function of a food product type.

5. A method of predicting a shelf-life of food product type stored within a refrigeration case, comprising the steps of:
   determining a bacteria count limit for the food product type;
   initiating a first counter corresponding to placement of a first plurality of the food product type within the refrigeration case;
   initiating a second counter corresponding to placement of a second plurality of the food product type within the refrigeration case;
   determining a bacteria count of said first plurality of the food product type within the refrigeration case over a first period corresponding to said first counter;
   determining a bacteria count of said second plurality of the food product type within the refrigeration case over a second period corresponding to said second counter;
   removing either of said first and second pluralities of the food product type from the refrigeration case when said bacteria count limit has been achieved for either of said first and second pluralities of the food product type.

6. The method of claim 5, further comprising the step of monitoring a temperature of said first plurality of the food product type within the refrigeration case over said first period corresponding to said first counter.

7. The method of claim 5, further comprising the step of monitoring a temperature of said second plurality of the food product type within the refrigeration case over said second period corresponding to said second counter.

8. The method of claim 5, further comprising the step of resetting either of said first and second counters upon respective removal of either of said first and second pluralities of the food product type from the refrigeration case.

9. A system for monitoring food product of a remote location through a communication network, said system comprising a management center in communication with the remote location through the communication network, said management center receiving food product data from the remote location and determining a value from a variable bacteria count associated with the monitored food product.

10. The system of claim 9, further comprising an alarm provided at either of the remote location and said management center to indicate whether said value exceeds a limit.

11. The system of claim 10, wherein said limit is a food safety limit indicating said variable bacteria count for the food product has achieved a potentially harmful level.

12. The system of claim 10, wherein said limit is a food quality limit indicating said variable bacteria count has achieved an undesirable level.

13. The system of claim 9, wherein said food product data includes temperature data and time data for determining said value.

14. The system of claim 13, wherein said value is determined as a function of said temperature data and said time data.

15. The system of claim 13, wherein said management center compares said value to a limit, said limit determined as a function of a temperature set point and a time set point.

16. The system of claim 15, wherein said limit is achieved if said temperature data exceeds said temperature set point for a consecutive time period that is greater than said time set point.

17. The system of claim 9, wherein said management center compares said food product data to a set point.

18. The system of claim 17, wherein said set point is a function of a bacterial growth rate of the food product.

19. The system of claim 18, wherein said management center integrates said food product data with respect to time, wherein a limit is achieved if said integration is greater than said set point.

20. The system of claim 9, wherein said management center is given a bacteria count set point as a function of bacteria type, said management center calculating a bacteria count as a function of said food product data, wherein an alarm limit is met when said bacteria count exceeds said bacteria count set point.

21. The system of claim 9, further comprising a user interface associated with said management center, said user interface displaying food product data.

22. The system of claim 21, wherein said user interface includes a display for providing an alarm status.

23. A food retailer, comprising:
   a building housing a refrigeration system including a compressor, condenser, and at least one refrigeration case in communication via piping for transporting high pressure liquid refrigerant;
   a management center in communication with the refrigeration system through a communication network, said management center receiving food product data and determining a value from a variable bacteria count associated with refrigerated food product.

24. The food retailer of 23, wherein said refrigeration system includes a plurality of refrigeration circuits each including at least one refrigeration case.

25. The food retailer of claim 23, wherein said management center indicates an alarm at either a remote location or said building to indicate whether said value exceeds a limit.

26. The food retailer of claim 25, wherein said limit is a food safety limit indicating said variable bacteria count for the food product has achieved a potentially harmful level.

27. The food retailer of claim 25, wherein said limit is a food quality limit indicating said variable bacteria count has achieved an undesirable level.

28. The food retailer of claim 23, wherein said food product data includes temperature data and time data for determining said value.

29. The food retailer of claim 28, wherein said value is determined as a function of said temperature data and said time data.

30. The food retailer of claim 28, herein said management center compares said value to a limit, said limit determined as a function of a temperature set point and a time set point.

31. The food retailer of claim 30, wherein said limit is achieved if said temperature data exceeds said temperature set point for a consecutive time period that is greater than said time set point.

32. The food retailer of claim 23, wherein said management center compares said food product data to a set point.

33. The food retailer of claim 32, herein said set point is a function of a bacterial growth rate of the food product.

34. The food retailer of claim 33, wherein said management center integrates said food product data with respect to time, wherein a limit is achieved if said integration is greater than said set point.

35. The food retailer of claim 23, wherein said management center is given a bacteria count set point as a function of bacteria type, said management center calculating a bacteria count as a function of said food product data, wherein an alarm limit is met when said bacteria count exceeds said bacteria count set point.

36. The food retailer of claim 23, further comprising a user interface associated with said management center, said user interface displaying food product data.

* * * * *

UNITED STATES PATENT AND TRADEMARK OFFICE
CERTIFICATE OF CORRECTION

PATENT NO. : 6,549,135 B2 Page 1 of 1
DATED : April 15, 2003
INVENTOR(S) : Abtar Singh et al.

It is certified that error appears in the above-identified patent and that said Letters Patent is hereby corrected as shown below:

Column 4,
Line 32, "softward" should be -- software --.

Column 8,
Line 10, after "temperature" delete "of".

Column 12,
Line 59, after "of" insert -- claim --.

Column 13,
Line 10, "herein" should be -- wherein --.

Column 14,
Line 1, "herein" should be -- wherein --.

Signed and Sealed this

Thirtieth Day of September, 2003

JAMES E. ROGAN
*Director of the United States Patent and Trademark Office*